United States Patent [19]

Nakagawa et al.

[11] Patent Number: 4,954,860

[45] Date of Patent: Sep. 4, 1990

[54] FOCAL-PLANE SHUTTER

[75] Inventors: Tadashi Nakagawa; Takahito Otora; Ichiro Nemoto, all of Chiba, Japan

[73] Assignee: Seikosha Co., Ltd., Tokyo, Japan

[21] Appl. No.: 346,100

[22] Filed: May 2, 1989

[30] Foreign Application Priority Data

May 11, 1988 [JP] Japan ............................ 63-61939[U]

[51] Int. Cl.[5] ................................................ G03B 9/40

[52] U.S. Cl. .................................... 354/246; 354/249

[58] Field of Search ................ 354/246, 248, 249, 250

[56] References Cited

U.S. PATENT DOCUMENTS 2,975,689 3/1961 Chatani .............................. 354/246

4,141,638 2/1979 Ooba .................................. 354/246

4,486,084 12/1984 Sato et al. .......................... 354/246

4,560,265 12/1985 Hashimoto ......................... 354/246

4,571,045 2/1986 Uematsu ............................. 354/246

4,797,699 1/1989 Nemoto et al. ..................... 354/250

*Primary Examiner*—A. A. Mathews

*Attorney, Agent, or Firm*—Jordan and Hamburg

[57] ABSTRACT

A focal-plane shutter for a camera includes two shutter blades each of which comprises two opaque plates. At least one of the two plates has a slit and is held at two points by two arms such that the plates move like a pantograph. The arms are pivotally mounted by eccentric pins to provide for adjusting the parallelism of the blades.

14 Claims, 5 Drawing Sheets

1 7 6 10 2 12a 12 12b 8 9 11 3 5 1a

FOCAL-PLANE SHUTTER

FIELD OF THE INVENTION

The present invention relates to a focal-plane shutter for use in a camera and, more particularly, to a focal-plane shutter having two shutter blades one of which is used to open the aperture in the shutter, the other being used to close the aperture. In each shutter blade, either plural opaque plates or a least one plate forming a slit is held at two points by two arms to permit the plate or plates to move like a pantograh.

BACKGROUND OF THE INVENTION

A conventional shutter blade of the above-described structure will now be described by referring to FIGS. 3 and 4, where a shutter has a base plate 1 provided with an aperture 1*a*. Arms 2 and 3 are pivotally mounted to the plate 1 by shafts 4 and 5, respectively. A slit plate 6 having a slit for exposure is pivoted to the arms 2 and 3 by shafts 7 and 8, respectively. Similarly, a cover plate 9 is pivotally mounted to the arms 2 and 3 by shafts 10 and 11, respectively. The aperture 1*a* is covered by the slit plate 6 and the cover plate 9.

Only one of two similar shutter blades which are symmetrical with respect to a horizontal line is shown in FIGS. 3 and 4; for clarity, the other is not shown. In the condition shown in FIG. 3, the shutter blade is folded up and has moved away from the aperture 1*a*. In the condition shown in FIG. 4, the shutter blade is in a position to cover the aperture 1*a*.

When the shutter is tripped for exposure, the shutter blade is very quickly switched from the condition shown in FIG. 3 to the condition shown in FIG. 4 or vice versa. During this process, the arms 2 and 3 rotate to move the slit plate 6 and the cover plate 9 upwardly or downwardly while they are maintained in a horizontal posture.

Because of the inertia of various components and errors arising during the manufacturing process, the slit plate 6 may be inclined relative to the aperture 1*a*. Therefore, the plate 6 is not retained in the horizontal posture while moving. As a result, the exposure becomes non-uniform, i.e., the exposure time differs between the right portion and the left portion of the aperture. In recent years, it has been required to shorten the exposure time. With this trend, the width of the slit is reduced. Consequently, the effects of the inclination of the slit plate become more conspicuous.

SUMMARY OF THE INVENTION

In view of the foregoing drawback with the prior art device, it is an object of the invention to provide a focal-plane shutter for use in a camera and in which plate-forming slits are driven in a parallel relation to each other, whereby the exposure time is prevented from differing between the left portion and the right portion of the aperture.

The above object is achieved by a focal-plane shutter comprising two sets of shutter blades each of which consists of a plurality of opaque plates, at least one of the plates having a slit and held at two points by two arms so that the plates may move like a pantograph. The shutter is characterized in that it includes adjusting portions which adjust the inclination of the plates forming the slits.

Other objects and features of the invention will appear in the course of the description thereof which follows.

DETAILED DESCRIPTION OF THE INVENTION

Figure 1:
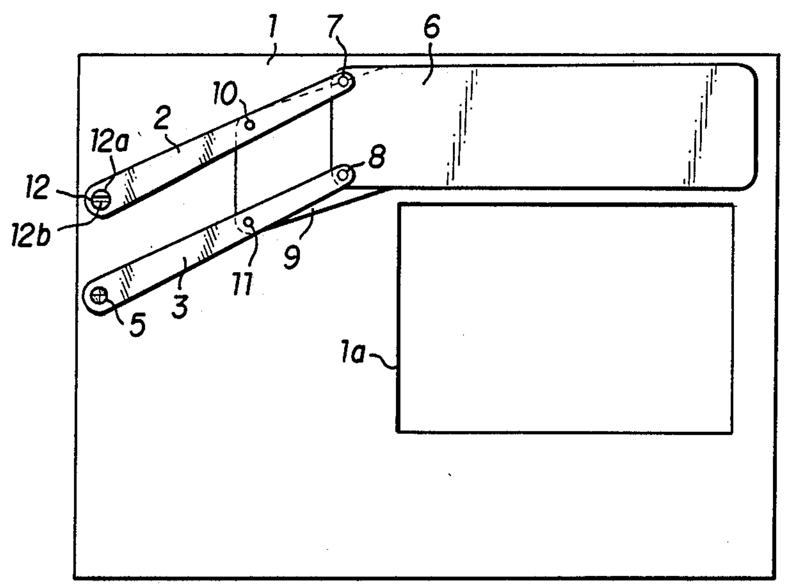
FIG. 1 is a front elevational view of the main portions of one set of blades of a focal-plane shutter according to the invention in which the blades are withdrawn.
Figure 2:
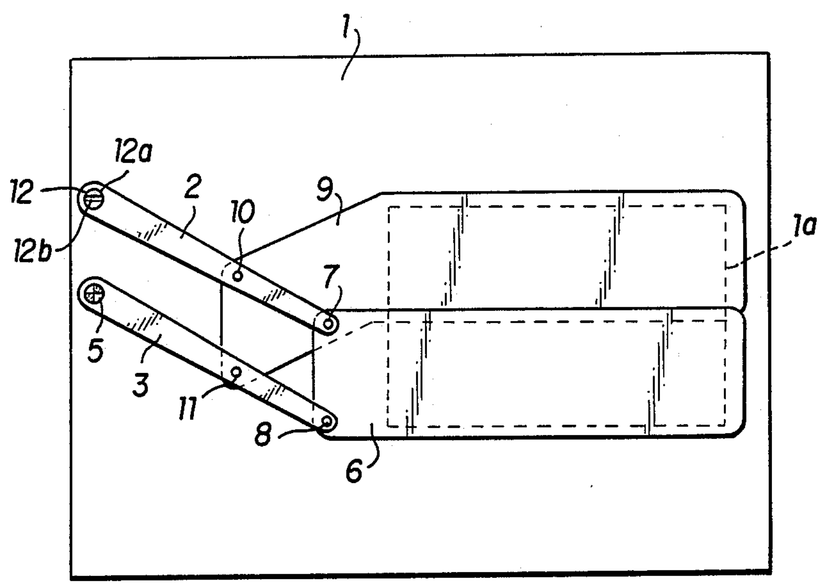
FIG. 2 is a view similar to FIG. 1 but in which the blades are in a closed position.

Referring to FIGS. 1 and 2, there is shown a focal-plane shutter embodying the concept of the invention. It is to be noted that like components are indicated by like reference numerals in all the figures, and that those components which have already been described in conjunction with FIGS. 3 and 4 will not be described in detail below. FIGS. 1 and 2 correspond to FIGS. 3 and 4, respectively.

Figure 3:
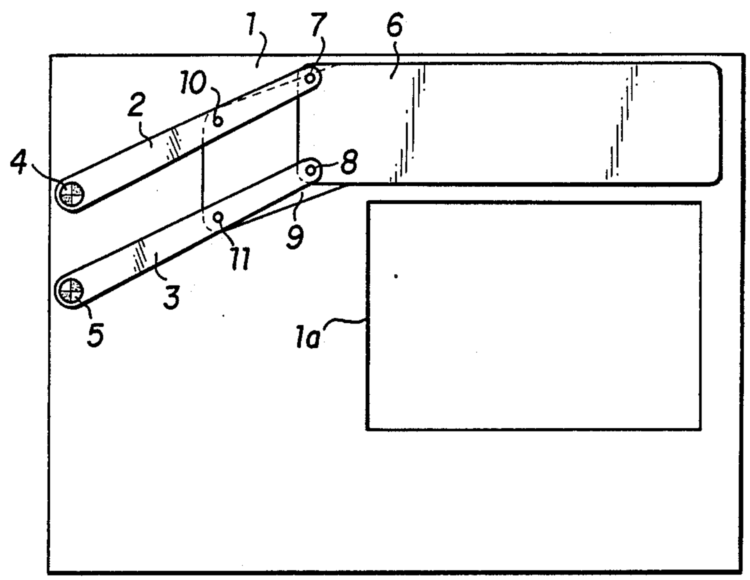
FIG. 3 is a front elevational view of the main portions of one set of blades of a conventional shutter in which the blades are withdrawn.
Figure 4:
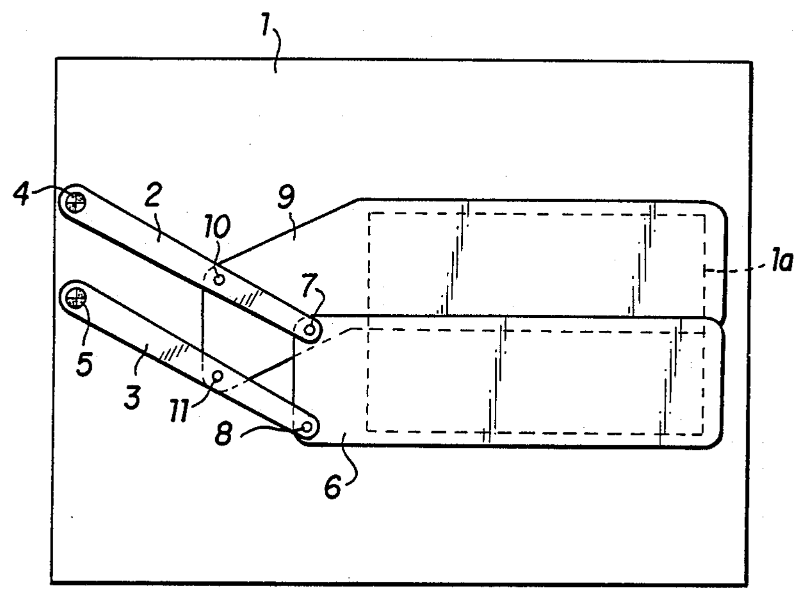
FIG. 4 is a view similar to FIG. 3 but in which the blades are in a closed position.
Figure 5:
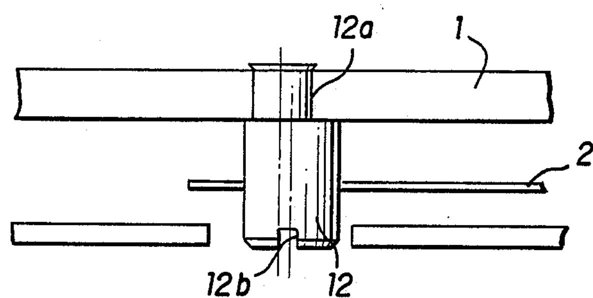
FIG. 5 is a cross-sectional view, on a larger scale, of one of the pivotal supports.
Figure 6:
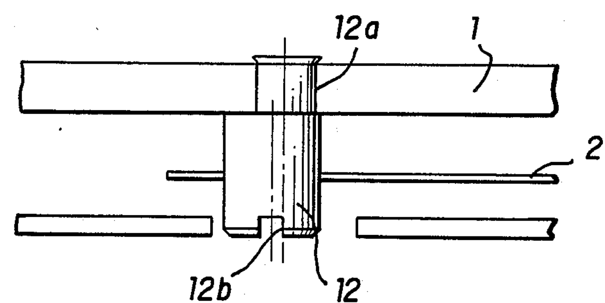
FIG. 6 is a cross-sectional view, similar to FIG. 5, but showing another position of the pivotal supports.

In FIGS. 1, 2, 5 and 6, arm 2 has a shaft 12 consisting of an eccentric pin 12*a*. Plate 6 is provided with a slit. If the plate is inclined relative to apertures 1*a*(for example, as shown in FIG. 3); the plate 6 can be aligned with the aperture 1*a* by rotating the shaft 12 for example, with a turning tool (e.g., a screwdriver) inserted in the slot 12*b*.

In the present example, only the shaft 12 of the arm 2 comprises an eccentric pin. However, the pivot points 7 and 8 at which the plate 6 is held by arms 2 and 3 can also be fabricated in the same manner as the shaft 12.

In the above example, an adjustment is made to prevent the plate 6 having the slit from tilting relative to the aperture 1*a*. It is also possible to make an adjustment so as to prevent the other plate (not shown) having a slit from tilting.

As described thus far, in accordance with the present invention, the points at which the plate are held by the arms or the pivots of the arms are each comprised of an adjustable eccentric pin. Therefore, the two slit plates are so adjusted as to move parallel to each other. Consequently, non-uniformity of exposure is decreased in that the time during which the left portion of the aperture is exposed and the time during which the right portion is exposed is more uniform. The invention is especially useful for high-speed shutters having narrow slits.

What we claim is:

1. A focal-plane shutter comprising a base member having an aperture, shutter blades for opening and closing said aperture, and pivotal support means on said base member operable in a parallelogrammatic configuration to move said blades between open and closed positions to thereby open and close said aperture, said pivotal support means having adjusting means for adjusting the tilt of said blades relative to said aperture to provide for parallel movement of said blades and uniformity of exposure of said aperture during opening and closing of said aperture by said blades.

2. A focal-plane shutter according to claim 1, wherein said adjusting means comprise an eccentric pivot means.

3. A focal-plane shutter according to claim 2, wherein said eccentric pivot means comprises an eccentric pin.

4. A focal-plane shutter according to claim 1, wherein said pivotal support means comprises two arms pivotably mounted on said base member at two spaced pivot connections, at least one of said pivot connections having an eccentric pin.

5. A focal-plane shutter according to claim 1, wherein said pivotal support means comprises two arms pivotably mounted on said base member, said arms being pivotably connected to one of said blades at two spaced pivot points, at least one of said pivot points being an eccentric pin.

6. A focal-plane shutter comprising a base plate having an aperture, two sets of shutter blades for opening and closing said aperture, said two sets of shutter blades each being provided with a plurality of opaque plates, and pivotal arm means pivotably connected to said base plate at two spaced pivot connections and pivotably connected to at least one plate of one set of shutter blades at two spaced pivot connections in a substantially parallelogrammatic configuration such that the plates are moveable between open and closed positions to thereby open and close said aperture, and adjusting means on said pivotal arm means for adjusting the orientation of said plates relative to said aperture to provide for parrallelism of said blades and uniformity of exposure of said aperture as said blades open and close said aperture.

7. A focal-plane shutter according to claim 6, wherein said adjusting means comprises an eccentric pivot pin.

8. A focal-plane shutter comprising a base plate having an aperture, two sets of shutter blades for opening and closing said aperture, said two sets of shutter blades each being provided with a plurality of opaque plates, a pair of arm means for pivotably supporting said plates on said base plate in a substantially parallelogrammatic configuration for movement between open and closed positions to thereby open and close said aperture, and adjusting means on said arm means and on said base plate for adjusting the inclination of said plates relative to said aperture to thereby provide for parallel movement of said blades as said blades open and close said aperture.

9. A focal-plane shutter according to claim 8, wherein said adjusting means comprises an eccentric pivot pin.

10. A focal-plane shutter according to claim 1, wherein said pivotal support means comprises two arms, said pivotal support means further comprising first dual pivotal supports for pivotably supporting each of said two arms on said base member, said pivotal support means further comprising second dual pivot supports on said two arms for pivotably supporting one of said blades, said pivotal support means further comprising third dual pivot supports on said two arms for pivotably supporting another of said blades.

11. A focal-plane shutter according to claim 10, wherein said first and second dual pivot supports define a parallelogram.

12. A focal-plane shutter according to claim 10, wherein said second and third dual pivot supports define a parallelogram.

13. A focal-plane shutter according to claim 10, wherein at least one of the pivot supports of at least one of said dual pivot supports comprises a rotably mounted eccentric member which defines said adjusting means.

14. A focal-plane shutter comprising a base plate having an aperture, shutter blades for opening and closing said aperture, a pair of pivot arms, first and second pivot means spaced from one another and pivotably supporting said two pivot arms on said base plate, third and fourth pivot means spaced from one another and pivotably supporting one of said blades on said two arms, fifth and sixth pivot means spaced from one another and pivotably supporting another of said blades on said two arms, said first to fourth pivot means substantially defining one parallelogram and said third to sixth pivot means substantially defining another parallelogram as said blades are moved to open and close said aperture, and adjusting means on at least one of said first to sixth pivot means for adjusting said one pivot means to thereby change the relative position of at least one of said blades relative to said aperture, said change in relative position being determined with said two pivot arms in the same pivotal position.

* * * * *